United States Patent [19]
Brette

[11] 3,959,778
[45] May 25, 1976

[54] APPARATUS FOR TRANSFERRING DATA FROM A VOLATILE MAIN MEMORY TO A STORE UNIT UPON THE OCCURRENCE OF AN ELECTRICAL SUPPLY FAILURE IN A DATA PROCESSING SYSTEM

[75] Inventor: Yves-Jean Brette, Sevres, France

[73] Assignee: Compagnie Honeywell Bull (Societe Anonyme), Paris, France

[22] Filed: Aug. 30, 1974

[21] Appl. No.: 502,169

[30] Foreign Application Priority Data
Sept. 5, 1973  France .................. 73.32063

[52] U.S. Cl. .................. 340/172.5; 307/68
[51] Int. Cl.² .................. G06F 1/00; G06F 13/00
[58] Field of Search .............. 340/172.5; 235/153 A, 235/153 R, 153 AM; 307/68, 154; 317/31; 290/30

[56] References Cited
UNITED STATES PATENTS

| | | |
|---|---|---|
| 3,321,747 | 5/1967 | Adamson .................. 340/172.5 |
| 3,416,139 | 12/1968 | Marx .................. 340/172.5 |
| 3,624,617 | 11/1971 | Putterman .................. 340/172.5 |
| 3,801,963 | 4/1974 | Chen .................. 340/172.5 |

Primary Examiner—Mark E. Nusbaum
Assistant Examiner—James D. Thomas
Attorney, Agent, or Firm—Lowe, King, Price & Markva

[57] ABSTRACT

The disclosure describes improved apparatus for transferring data from the main memory of a data processor to a peripheral permanent storage unit, such as a data recording holder driven by a driving device, in response to a failure of the main electrical supply to the data processor. The apparatus includes frequency converters for supplying voltage to the processor for about 500 milliseconds after the power fails. Logic and selector circuitry reads the contents of main memory into a selected permanent storage unit within the 500 millisecond time period so that the perishable data in main memory will not be lost.

12 Claims, 3 Drawing Figures

APPARATUS FOR TRANSFERRING DATA FROM A VOLATILE MAIN MEMORY TO A STORE UNIT UPON THE OCCURRENCE OF AN ELECTRICAL SUPPLY FAILURE IN A DATA PROCESSING SYSTEM

RELATED APPLICATION

Priority is claimed under French Application Ser. No. 73,32063, filed Sept. 5, 1973.

BACKGROUND AND SUMMARY OF THE INVENTION

The present invention relates to electrical supply and data transfer apparatus for normally providing electrical power from the mains of an electrical supply to a data processing system comprising several permanent store units connected to a computer, and, in response to a power supply failure, for transferring the fundamental data held in that computer into one of the permanent store units.

Recently developed data processing systems usually are highly complex assemblies in which all peripheral units are connected to at least one computer. The peripheral units exchange data with that computer according to the instructions of a program held partly in the central store (main memory) of that computer and partly in the permanent store units (for example magnetic discs or tapes) connected to that computer.

These data processing systems are usually supplied from a utility electrical distribution network at low frequency (50 to 60 Hz) and, consequently, are very sensitive to disturbances, such as micro-interruptions, transient overvoltages and power failures which could occur on that network.

These disturbances could alter or even destroy not only the information stored or being processed, but also the programs held in the central store for the purpose of that processing. These disturbances are especially irksome because they make it necessary to check the data in the central store, to run the program a second time, and to execute test programs before taking up the processing from the stage to which it has progressed just prior to the disturbances.

In order to overcome the loss of time and the possibilities of errors entailed by these operations, it was found convenient to supply the data processing system from the utility electrical supply through the intermediary of motor generator sets, each set consisting of a motor connected to the electrical power supply and an alternator drive by the motor which supplies power to the data processing system. A flywheel mounted on the motor driving shaft ensures the stabilization of the rotating speed of the set and smooths out the effects of micro-interruptions. The type of motor used on such sets can be synchronous or asynchronous.

However, in the event of a power cut, the use of a synchronous motor requires complicated and very expensive equipment in order to ensure the re-synchronization of the motor without producing interferences in the computer. In order to avoid the need for such re-synchronization equipment, a standard rated asychronous motor is preferably used. The asynchronous motor carries a flywheel and drives the input shaft of a variable slip electro-magnetic coupling. The output shaft of the coupling drives an alternator at a speed slightly less than the speed of the motor. The alternator speed is stabilized by a second flywheel. During a power cut, the first flywheel slows down from its original speed to the alternator's speed, while the coupling holds the alternator's speed to its rated value by progressively reducing the slip. However, such a solution is relatively costly, heavy and bulky. Moreover, it does not meet easily the requirements of the driving devices of the peripheral units and of the various logic and memory circuits of the computer which require different voltages and frequencies.

The present invention overcomes these difficulties and not only ensures an electrical supply to the various engineering areas of the system, (e.g., motors, logic circuits and memory store), but moreover, in case of a power cut, transfers the data held in the main memory of the system to a given permanent store unit.

One feature of the invention relates to an electrical supply and data transfer device intended to supply electrical power to a data processing system comprising at least one permanent store unit and a main memory. This data processing system is supplied with voltage from a generator means connected to the supply, the generator means characterized by the ability to supply electrical power for a predetermined time period after the electrical supply fails. A detecting device connected to the electrical supply detects power cuts on the supply and, as soon as a power cut occurs, produces a failure indicating signal. Logic means transfer data from the main memory to a selected permanent store unit in response to a gating signal produced by a selector means. The selector means responds to the failure indicating signal by generating the gating signal and by conducting electrical power from the generator means to the permanent store unit so that data are transferred from the main memory into the selected store unit between the time a power cut is detected and the time the selected store unit ceases to be energized by the generator means.

DESCRIPTION OF THE DRAWINGS

Other characteristics and advantages of the invention will be seen in the following description given as a non restrictive example and referring to the attached drawings in which.

DESCRIPTION OF THE PREFERRED EMBODIMENTS

Figure 1:
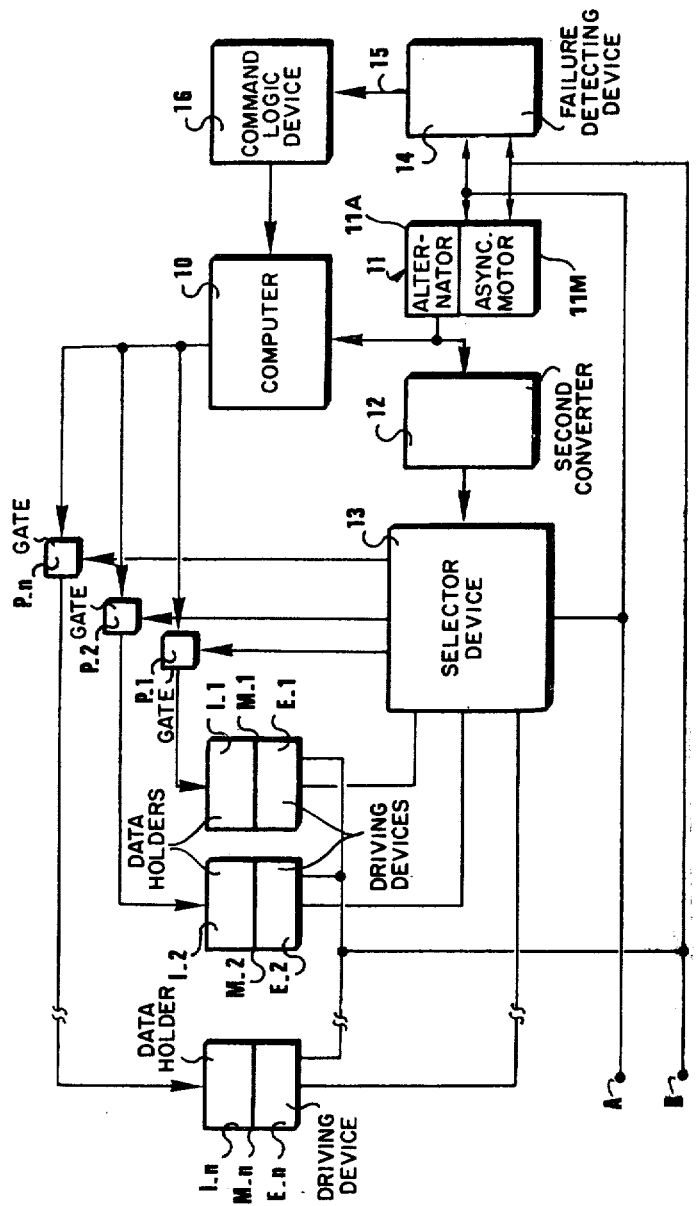
FIG. 1 is a schematic drawing illustrating the layout for a data processing system fed by a supply and made in accordance with the invention.

FIG. 1 shows in schematic form a data processing system comprising a central computer 10 to which permanent store units M-1, M-2 . . . M-n are connected through gates P-1, P2 . . . P-n. In the example described, these storage units are made up of magnetic disks, but any other type of permanent store, magnetic tape units for example, could be used. The term "permanent store" means a store whose content is not erased nor altered as a result of an interruption of the supply voltage. Each one of the permanent store units, M-1, M-2 . . . M-n, comprises a data holder (disc or magnetic tape for example) which in FIG. 1 is symbolically represented by a square denoted by 1—1, 1-2, . . . 1-n. Data holders 1—1, 1-2, . . . 1-n are moved by driving devices E-1, E-2, . . . E-n, respectively. These driving devices consist of low frequency a.c. motors that are driven at the same frequency supplied by electrical supply terminals A and B. In nearly all cases, this frequency is 50 or 60 Hz. Terminals A and B are connected to the utility-supplied voltage lines.

In the example described, computer 10 is normally fed with medium frequency a.c. voltage provided by a rotating type converter 11 that is connected to terminals A and B. This well known type of converter consists, in the example given, of an asynchronous motor 11M driving directly an alternator 11A capable of generating, at 400 Hz, an a.c. voltage having an effective amplitude that remains constant when the motor is fed from terminals A and B. This converter has such a moment of inertia that the amplitude of the a.c. voltage it generates remains substantially equal to its nominal value for at least five hundred milliseconds following the instant a power cut occurs on terminals A and B. That is, the relative change of voltage measures at the end of these 500 milliseconds is less than 1%. This result can be achieved by various means, such as by mounting on the driving shaft of the alternator a flywheel having a sufficient moment of inertia for the angular speed of that shaft not to substantially alter during the five hundred milliseconds following the advent of the power supply cut.

The 400 Hz a.c. voltage that converter 11 supplies to the computer is used mainly to feed the various logic and memory circuits of that computer. As shown in FIG. 1, this 400 Hz a.c. voltage is also fed to a second converter 12 that reconverts the 400 Hz. voltage supplied to it by converter 11 to the electrical supply frequency (i.e., 50 to 60 Hz). Converter 12 can consist either of a rotating converter set or a static type converter. The low frequency a.c. voltage generated by converter 12 is fed to one of the driving devices E-1, E-2 . . . E-n of the permanent store units through a selector device 13 which shall be described later on.

Also shown in FIG. 1 is a power failure detecting device 14 which is connected across the two terminals A and B of the electrical supply and which is designed so that its output 15 produces a failure indicating signal the moment a power cut occurs on terminals A and B.

Computer 10 is normally connected to various peripheral elements (e.g., printers, card readers, magnetic disc units, etc.) which, for reason of simplification, have not been shown on the drawings. The transfer of information between the computer and these peripheral elements is carried out under the operating instructions of programs held in the central store of the computer. This store, or main memory, which has been schematically shown on FIG. 2 by a rectangle denoted 20, is usually a magnetic toroidal core store or a semiconductor store, so that its content can be altered or even destroyed of the store suddenly ceases to be energized. This is why the program held in this store has restarting points which, in case of power failure, permit the restarting of the on-going processing at the point which has been reached a few moments before the occurrence of the power cut. In advanced systems, memory 20 also holds fundamental data, such as parameters relating to the state of the system, including indications of the nonavailability of certain peripheral elements, as well as reference tables to which the program refers during its execution. It is the fundamental data (e.g., parameters, tables, etc.) which must be safeguarded when, because of power failure, the content of the memory 20 runs the risk of being altered or reduced to nothing.

Figure 2:
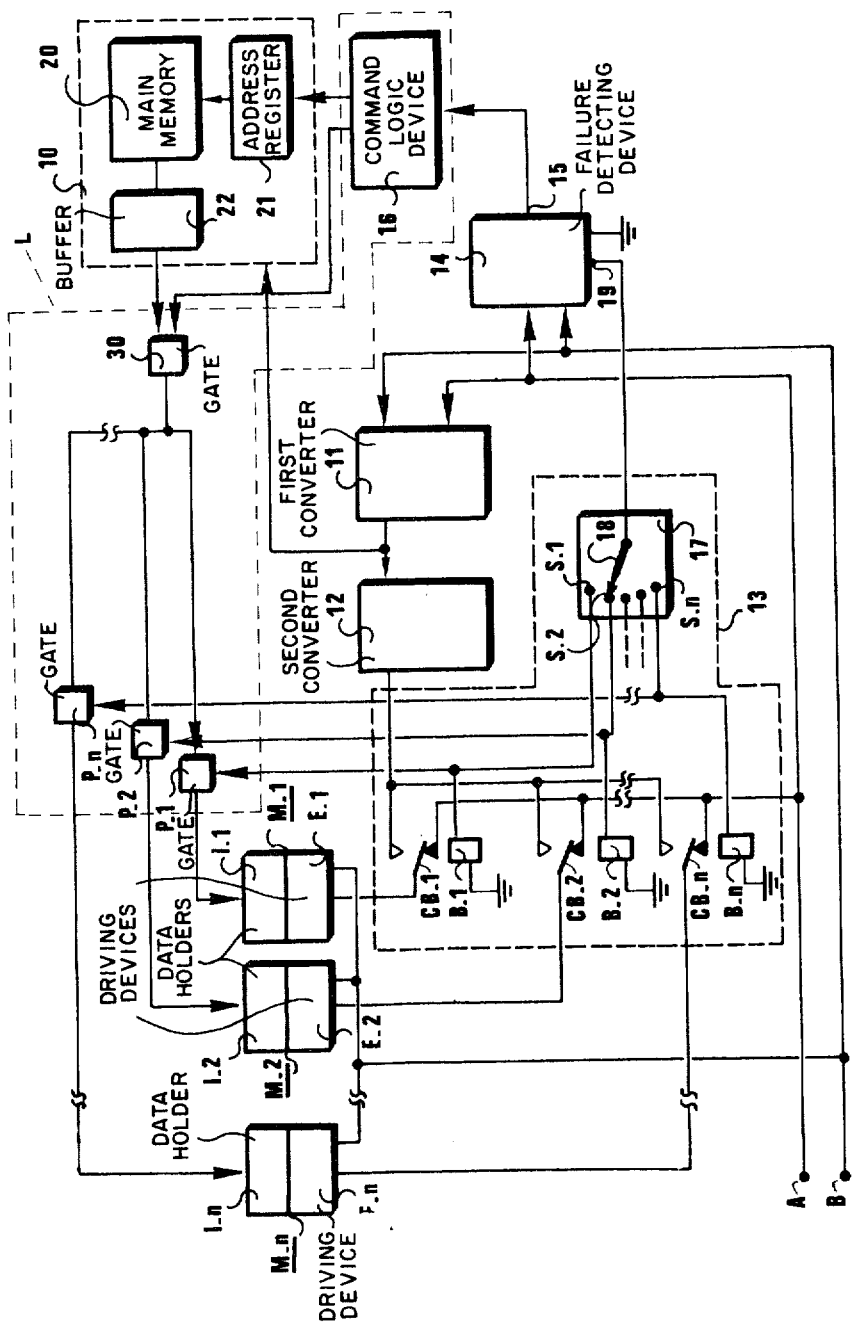
FIG. 2 is a schematic drawing illustrating the embodiment of FIG. 1 in more detail.

The details of the operations and apparatus which will safeguard the fundamental data are now going to be presented using FIG. 2 which repeats the drawing of FIG. 1, but shows in more detail the structure of the switched device 13 and also some constituent elements of computer 10. As can be seen in FIG. 2, selector device 13 is represented by a basic electrical circuit which contains contacts operated manually and by relays meant to be used under the conditions that shall be described. In FIG. 2, the change-over contacts of the relays are denoted by the same reference as that of the coil actuating them, but preceded by the letter C. A normally closed contact, when the coil of the relay actuating it is not energized, is represented in FIG. 2 by a darkened triangle. Each coil B-1, B-2 . . B-n of selector device 13 is associated with one of the respective permanent store units M-1, M-2 . . . M-n. As long as coils B-1, B-2 . . . B-n are not energized, contacts CB-1, CB-2 . . . CB-n remain in the quiescent position shown. Under these conditions, the driving devices E-1, E-2 . . . E-n are supplied with a.c. from terminals A and B through contacts CB-1, CB-2 . . CB-n. Each of the coils B-1, B-2 . . B-n can nevertheless be energized, in accordance with the rules that shall be described further on, in order to move its contact to the working position and thus enable the driving device to which it is associated to be fed with low frequency current supplied by the second converter 12. Coils B-1, B-2 . . B-n are respectively connected to outlet studs S-1, S-2 . . . S-n of selector switch 17. Switch 17 has a manually adjustable wiping contact 18 which is connected to an outlet 19 of power failure detecting device 14. Device 14 is designed so that its outlet 19 is at a positive voltage the moment a power cut occurs on terminals A and B. Therefore, as soon as a power cut is detected by device 14, a continuous current flows from outlet 19 through wiping contact 18 and the coil that is connected to the outlet stud on which the wiping contact has been positioned. Thus, thanks to the selector switch 17, only one of coils B-1, B-2 . . B-n will be energized from the moment a power failure occurs, and consequently only one of the driving devices E-1, E-2 . . E-n is fed, as from that moment, with current from converter 12. It should be mentioned, however, that instead of being connected to outlet 19 of detecting device 14, the wiping contact 18 of selector switch 17 could be directly connected to a current source independent of the electrical supply, so as to allow one of coils B-1, B-2 . . . B-n to be permanently energized and, consequently, the driving device associated with that coil to be fed with current from converter 12. It must be pointed out, furthermore, that the component parts of selector device 13 which, in the example described, consist of relay coils, could be made up of a group of electronic circuits fulfilling the same function, such as an arrangement of circuits with transistors, thyristors or others.

FIG. 2 also shows that computer 10 has selection facilities 21, such as an address register, that reads selected data from memory 20 into an intermediate register 22, such as an output buffer register. Selection facilities 21 are operated by logic circuitry L which controls the transfer of data from memory 20 to storage units M-1, M-2 . . . M-n. Selection facilities 21 are put into operation by command pulses sent by a logic command device 16, on receipt from the detecting device 14 of the failure indicating signal. The transfer of each data (byte, word or character), recorded temporarily in intermediate register 22, to one of the data holders 1—1, 1-2 . . . 1-n is carried out by command transfer pulses generated by the logic commmand device 16 and applied to a command gate 30. Device 16 can be an incremental counter which sequentially addresses each byte or word of data stored in store 20. The routing of this data to the chosen data holder is achieved by means of control gates P-1, P-2 . . P-n which are connected respectively to studs S-1, S-2 . . S-n of selector switch 17. When detecting device 14 detects a power failure, a gating pulse is transmitted over arm 18 and one of the studs so that the corresponding control gate is opened.

The operation of the device shown in FIG. 2 will now be described in more detail. In order that this operation be clearly understood, it shall be assumed that wiping contact 18 of selector switch 17 has been first of all set by the operator on stud S-2. However, as long as a power failure does not occur on the electrical supply, (i.e., terminals A and B) outlet 19 of detecting device 14 is not raised to a positive voltage. Consequently, gate P-2, which is connected to that outlet by means of wiping contact 18, remains inactive. Furthermore, no signal is present at outlet 15 of detecting device 14, so that logic command device 16 cannot carry out the extraction of the fundamental data held in memory 20. Also as coils B-1, B-2 . . B-n are not energized, contact CB-1, CB-2 . . CB-n are all in the quiescent position shown. Hence, driving devices E-1, E-2 . . . E-n are all fed with low frequency a.c. from terminals A and B. Finally, converter 11 supplies computer 10 with medium frequency (400 Hz) a.c. voltage. Under these conditions, computer 10 is able to process data and to transmit the data to and from the peripheral elements.

As soon as a power cut occurs on the electrical supply, detecting device 14 produces at its terminal 15 a signal indicating failure while its outlet 19 is raised to a positive voltage. A current then circulates from outlet 19 through the wiping contact 18 which was positioned on stud S-2, and energizes coil B-2. Simultaneously, gate P-2, which is connected to stud S-2, is made active. Coil B-2 actuates its contact CB-2 is now fed by the low frequency current supplied by converter 12. Because of the inertia of converter 11, the electrical supply of driving device E-2 is maintained during the five hundred milliseconds which follow the instant of the failure, whereas the electrical supply to the other driving devices is cut off at that instant. Similarly, because of the inertia of converter 11, computer 10 continues to be fed with medium frequency a.c. voltage during the five hundred milliseconds which follow the instant of the failure. The failure indicating signal which is sent by detecting device 14 at the instant of the failure, triggers into operation command logic device 16.

Device 16 sends out pulses to selection facilities 21 to read out the fundamental data held im memory 20 into intermediate register 22. Device 16 also sends out pulses to gate 30 to trigger the transfer of data temporarily stored in intermediate register 22. Owing to the fact that among all gates P-1, P-2 . . P-n only gate P-2 is active, the data are routed through gate P-2 to store holder 1-2. Since store holder 1-2 is driven by driving device E-2 which continues to be supplied with voltage during the five hundred milliseconds following the instant of failure, it is apparent that the fundamental data held in memory 20 can be transferred to holder 1-2 between the time when a power cut is detected by detecting device 14 and the time when the driving device E-2 ceases to be supplied by converter 12, that is during five hundred milliseconds. It has been established that this interval of time is sufficient for safeguarding all the fundamental data and enabling the rapid resumption of a program interrupted because of an electrical supply failure.

Figure 3:
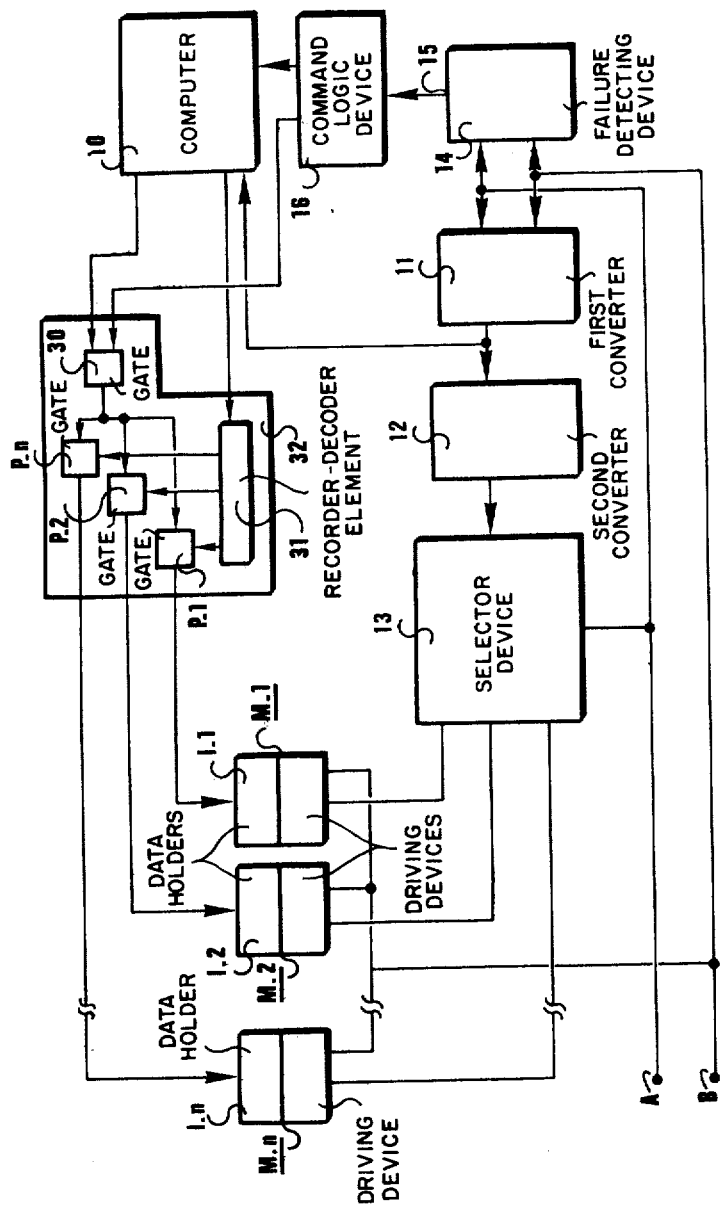
FIG. 3 is a schematic drawing illustrating an alternative embodiment of the invention.

FIG. 3 shows an alternative to the embodiment shown in FIG. 2. The elements shown in FIG. 3 are the same as those of FIG. 2 with the difference that gates P-1, P-2 . . . P-n, instead of being connected to the studs of selector switch 17, are connected to the outlet of a recorder-decoder element 31. This element 31, of known structure, stores and decodes a holder selecting address code which specifies the data holder to which the fundamental data read out of computer 10 will be sent. A gating signal resulting from the decoding of this selecting address code is produced on one of the outlets of recorder-decoder element 31 and activates the one of gates P-1, P-2 . . . P-n connected to the one outlet. In this way, the fundamental data from intermediate register 22 is only sent to the data holder connected to the activated gate, that is, only to the data holder specified by the selecting address code. The holder selecting address code which is stored in element 31 can either originate from a program previously recorded in computer 10 or be the result of an intervention by the operator before the data processing system is put into operation. In FIG. 3, gates P-1, P-2 . . P-n, 30 and the recorder-decoder 31 have been reassembled into only one element 32 called the data transfer selecting and operating element.

With the layout shown in FIG. 3, the position of selector switch 17 and the holder selecting address must be coordinated so that, in case of power failure, the driving device associated with the data-receiving holder is supplied with voltage during the five hundred millisecond time period following the instant of the failure.

Although the description and drawings appended relate to a preferred form of implementing the invention, it is understood that various modifications, additions, and substitutions not outside the bounds of the invention could be made, depending upon the cases and applications, without the principle of the invention being altered. In particular, the electric circuit of the selecting arrangement using relays which has been shown in FIG. 2 could be replaced completely, or in parts by any electronic circuit achieving an equivalent function.

What is claimed is:

1. In data processing system including a computer having a volatile main memory and a plurality of permanent store units, the data processing system being supplied with electrical power from an electrical supply operating at a predetermined low frequency, improved apparatus for transferring data from the main memory to a store unit upon the occurrence of an electrical supply failure, said apparatus comprising:

a first frequency converter of the rotating type connected between the computer and the electrical supply to supply said computer with electrical power at a medium frequency greater than the predetermined low frequency, said first converter being adapted to supply electrical power for a predetermined time period after the electrical supply fails;

a second frequency converter connected to the output of the first converter to reconvert to the electrical supply frequency, the electrical power it receives from the first converter;

detecting means connected to the electrical supply for generating a failure indicating signal in response to a failure of the electrical supply;

command logic means connected to the computer and to said detecting means for controlling transfer towards the store units of the data held in the main memory upon receiving a failure indicating signal; and switching means connected, on one hand, to the second converter and to the electrical supply, and, on the other hand, to the store units, to permit a selected store unit to be supplied with electrical power from said second converter, and to the other units to be supplied with electrical power from the electrical supply, whereby data are transferred from the main memory into the selected store unit within the predetermined time period after a supply failure is detected by the detecting means.

2. Apparatus, as claimed in claim 1, wherein the first frequency converter comprises means for normally generating an alternating voltage having a predetermined amplitude and means for establishing a moment of inertia sufficient to continue generating the alternating voltage at substantially the predetermined amplitude for five hundred milliseconds after the instant at which the first frequency converter ceases to receive electrical power from the electrical supply.

3. Apparatus, as claimed in claim 1, wherein the permanent store means comprises a plurality of data recording holders each driven by a driving device, and wherein the switching means comprises a selector switch and a plurality of change over contacts put under the control of said selector switch, each change over contact being connected to a corresponding one of the driving devices in order that each driving device can be connected either to the electrical supply or to the second frequency converter, the said change over contacts being operated by the selector switch in such a manner that, on the occurrence of an electrical supply failure, only one of the driving devices is connected to the second converter, whereas the remaining driving devices are connected to the electrical supply.

4. Apparatus, as claimed in claim 4, the further comprising a separate control gate operatively connected between the main memory and each data recording holder, each control gate being operatively connected to a single change over contact to permit the transfer of said data to the data holder having a corresponding drive unit connected by the selector switch to the second frequency converter and for preventing the transfer of said data to other data recording holders.

5. Apparatus, as claimed in claim 4, wherein the command logic means comprises incrementable means for sequentially addressing each byte of data stored in main memory in response to the failure indicating signal.

6. Apparatus, as claimed in claim 5, further comprising a command gate operatively connected between the main memory and the control gates, said command gate being responsive to a transfer command pulse sent by said logic command means to transfer data extracted from the main memory toward the control gates.

7. Apparatus, as claimed in claim 3, further comprising data transfer selecting and operating means comprising a separate control gate operatively connected between the main memory and each data recording holder and means for storing a selection address code identifying a predetermined one of the data recording holders into which data is to be transferred and for generating a gating signal for opening the control gate connected between main memory and the predetermined data recording holder so that data is transferred from the main memory to the predetermined data recording holder and is excluded from the other of the data recording holders, the selector switch being positioned so that the driving device associated with the predetermined data recording holder is connected to the second frequency converter.

8. In a data processing system including a computer having a volatile main memory and a permanent store unit having a driving device, the data processing system being supplied with electrical power from an a.c. electrical supply, improved apparatus for transferring data from the main memory to the store unit upon the occurrence of an electrical supply failure, said apparatus comprising:

a motor generator set connected to be powered by the electrical supply for supplying said main memory with electrical power while the electrical supply is operative, said motor generator set having a large moment of inertia so that it is capable of generating substantially the same amount of electrical power for a predetermined time period after the electrical supply fails as while the electrical supply is operative;

detecting means connected to the electrical supply for deriving a failure indicating signal in response to a failure of the electrical supply;

command logic means connected to the computer and to said detecting means for transferring the data held in the main memory to the store unit in response to derivation of the failure indicating signal, and means for supplying power from the motor generator set to the driving device while the a.c. supply is inoperative, said predetermined time being sufficient to enable the transfer of the data from the main memory to the permanent store unit.

9. The system of claim 8 wherein the means for supplying power from the motor generator set to the driving device comprises a frequency converter electrically powered by the generator of the motor generator set, the frequency derived from the frequency converter being approximately the same as the frequency of the a.c. supply, means for supplying power from the a.c. supply to the driving device while the a.c. supply is operative, and means for supplying power to the driving device from the converter only while the a.c. supply is inoperative.

10. The system of claim 9 wherein the permanent store unit includes a plurality (N) of separate storage sub-units, each of said sub-units including its own separate driving device, and means responsive to the Kth occurrence of the failure indicating signal for supplying power to the driving device of the Kth sub-unit and for transferring data to the Kth sub-unit, where K = 1, 2, . . . N, the data being transferred and the power being simultaneously supplied to the Kth sub-unit.

11. The system of claim 8 wherein the permanent store unit includes a plurality (N) of separate storage sub-units, each of said sub-units including its own separate driving device, and means responsive to the Kth occurrence of the failure indicating signal for supplying power to the driving device of the Kth sub-unit and for transferring data to the Kth sub-unit, where K = 1, 2, . . . N, the data being transfered and the power being simultaneously supplied to the Kth sub-unit.

12. In a data processing system including a computer having a volatile main memory and a plurality (N) of permanent store units, each of said permanent store units including a separate driving device, the data processing system being normally supplied with electrical power from an electrical supply, improved apparatus for transferring data from the main memory to a store unit upon the occurrence of an electrical supply failure, said apparatus comprising:

first means for supplying said computer with electrical power while the electrical supply is inoperative;

detecting means connected to the electrical supply for deriving a failure indicating signal in response to the electrical supply being inoperative;

second means for supplying electrical power to the drive devices while the electrical supply is inoperative; and command logic means connected to the computer and to said detecting means for transferring the data held in the main memory to the Kth store unit in response to the Kth failure indicating signal, where K = 1, 2 . . . N, said command logic means including means responsive to the Kth occurrence of the failure indicating signal for supplying power from the second power supplying means to the Kth driving device and for transferring data to the Kth permanent store unit, the data being transferred and the power being simultaneously supplied to the Kth unit.

* * * * *